United States Patent
Grant et al.

(10) Patent No.: US 10,566,822 B2
(45) Date of Patent: Feb. 18, 2020

(54) PROVIDING A MOVABLE CHARGING COIL

(71) Applicant: Toyota Motor Engineering & Manufacturing North America, Inc., Erlanger, KY (US)

(72) Inventors: Cassandra R. Grant, Saline, MI (US); Frankie B. Reed, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 117 days.

(21) Appl. No.: 15/662,680

(22) Filed: Jul. 28, 2017

(65) Prior Publication Data
US 2019/0036369 A1    Jan. 31, 2019

(51) Int. Cl.
| | |
|---|---|
| *H02J 7/02* | (2016.01) |
| *H02J 50/90* | (2016.01) |
| *B60R 16/03* | (2006.01) |
| *H02J 50/10* | (2016.01) |
| *H02J 7/14* | (2006.01) |
| *H02J 7/00* | (2006.01) |

(52) U.S. Cl.
CPC ............. *H02J 7/025* (2013.01); *B60R 16/03* (2013.01); *H02J 7/0044* (2013.01); *H02J 7/1461* (2013.01); *H02J 50/10* (2016.02); *H02J 50/90* (2016.02)

(58) Field of Classification Search
CPC ...................................................... H02J 7/025
USPC ......................................................... 320/108
See application file for complete search history.

(56) References Cited

U.S. PATENT DOCUMENTS

| | | |
|---|---|---|
| 7,750,508 B2 | 7/2010 | Kato et al. |
| 9,197,094 B2 | 11/2015 | Van Wiemeersch et al. |
| 2007/0152957 A1 | 7/2007 | Shibata |
| 2014/0176057 A1* | 6/2014 | Van Wiemeersch ........ H02J 7/0044 320/108 |

(Continued)

FOREIGN PATENT DOCUMENTS

| | | |
|---|---|---|
| KR | 20160145963 A | 12/2016 |
| WO | 2016009056 A1 | 1/2016 |

OTHER PUBLICATIONS

Amazon website; URL: https://www.amazon.ca/Wireless-ELEPHAS-Charging-Blackberry-Qienabled/dp/B01HZCLOQO; Title: "Elephas Movable Qi Coil Wireless Charging Stand for Samsung Galaxy S8/S8 Plus 27/S7 Edge S6/S6 Edge/S6 Edge Plus Note 5 and All Qi-enabled Devices".

*Primary Examiner* — Edward Tso
*Assistant Examiner* — Ahmed H Omar
(74) *Attorney, Agent, or Firm* — Dinsmore & Shohl LLP

(57) ABSTRACT

Embodiments for providing a movable charging coil are provided. One embodiment includes a console that includes a device receptacle. Embodiments also include a first biased retention finger and a second biased retention finger disposed on the device receptacle, where the first biased retention finger and the second biased retention finger removably secure any of a plurality of differently sized mobile devices. Embodiments may also include a movable charging coil that is disposed within the console, as well as a computing device. The computing device may include logic that, when executed by a processor causes the computing device to determine a type of mobile device received in the device receptacle, and adjust a position of the movable charging coil.

17 Claims, 5 Drawing Sheets

(56) References Cited

U.S. PATENT DOCUMENTS

| | | | |
|---|---|---|---|
| 2014/0253030 A1* | 9/2014 | Moon | H02J 7/025 320/108 |
| 2015/0380954 A1* | 12/2015 | Poulton | H02J 7/007 320/106 |
| 2016/0261135 A1 | 9/2016 | Iwabuchi | |
| 2016/0325630 A1 | 11/2016 | Dede et al. | |
| 2017/0070077 A1* | 3/2017 | Karanikos | H02J 7/025 |
| 2017/0225582 A1* | 8/2017 | Augst | H02J 50/10 |
| 2018/0287413 A1* | 10/2018 | Jung | H02J 7/00 |

* cited by examiner

PROVIDING A MOVABLE CHARGING COIL

TECHNICAL FIELD

Embodiments described herein generally relate to providing a movable charging coil and, more specifically, to providing a device receptacle with a charging coil that moves based on a type of mobile device received.

BACKGROUND

Current wireless charging systems for mobile devices in vehicles include a charging surface upon which the mobile device is placed. However, as the charging efficiency is related to the alignment and position of the movable charging coil within the mobile device, incorrect placement or movement of the mobile phone during travel decreases the charging efficiency.

SUMMARY

Embodiments for providing a movable charging coil are described. One embodiment of a vehicle includes a console that includes a device receptacle for receiving any of a plurality of differently sized mobile devices. The vehicle may also include a first biased retention finger and a second biased retention finger disposed on the device receptacle, where the first biased retention finger and the second biased retention finger removably secure a mobile device that is received by the device receptacle. In these embodiments, the mobile device that is received by the device receptacle may include a battery and an induction coil for receiving wireless charging for the battery. The vehicle may also include a movable charging coil and a computing device. The computing device may include logic that, when executed by a processor, causes the computing device to determine a type of mobile device received by the device receptacle and adjust a position of the movable charging coil, based on the type of mobile device received.

In another embodiment, a console includes a device receptacle. These embodiments also include a first biased retention finger and a second biased retention finger disposed on the device receptacle, where the first biased retention finger and the second biased retention finger removably secure any of a plurality of differently sized mobile devices. Embodiments of the system may also include a movable charging coil that is disposed within the console, as well as a computing device. The computing device may include logic that, when executed by a processor, causes the computing device to determine a type of mobile device received by the device receptacle, and adjust a position of the movable charging coil.

In yet another embodiment, a system includes a console with a device receptacle. The system may also include a first biased retention finger and a second biased retention finger to removably secure any of a plurality of differently sized mobile devices, where the first biased retention finger and the second biased retention finger are disposed proximate the device receptacle. Additionally, a mobile device that is received by the device receptacle may include a battery and an induction coil for receiving wireless charging for the battery. The system may also include a movable charging coil that is disposed within the console, a movable charging coil arm that is coupled to the movable charging coil, and a computing device. The computing device may include logic that, when executed by a processor, causes the computing device to determine a type of mobile device received in the device receptacle and adjust a position of the movable charging coil, based on the type of mobile device received.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include embodiments for providing a movable charging coil. Some embodiments relate to a wireless charging system that includes a vertically oriented receptacle having spring loaded retention fingers to maintain a position of the mobile device. An actuator or motor is attached to the moveable wireless charging coil. The actuator moves the moveable wireless charging coil to an optimal position for charging the wireless phone based on (i) charging feedback to locate optimal charging position, (ii) camera identification of phone type and pre-stored phone coil location, and/or (iii) a device coil location stored in memory and corresponding to a smart key.

The moveable wireless charging coil allows for the proper alignment of the mobile device's induction coil where the coils of various different makes and models of mobile phones (e.g., iPhone 6s, iPhone 7s, Samsung Galaxies or Samsung Notes) differ in position. In some embodiments, a vehicle computing device and/or motor move the moveable wireless charging coil based on charging feedback to locate optimal charging position.

The vehicle computing device includes a database of the location of the wireless charging coils on various mobile device makes and models. An image capture device captures an image of the mobile device either prior to or when inserted into the device receptacle. The vehicle computing device may perform image analysis of the captured image to determine the make and model of the mobile device and then control the motor to move the moveable wireless charging coil to the pre-stored location of the wireless induction coil on the mobile device. The embodiments for providing a movable charging coil incorporating the same will be described in more detail, below.

Figure 1:
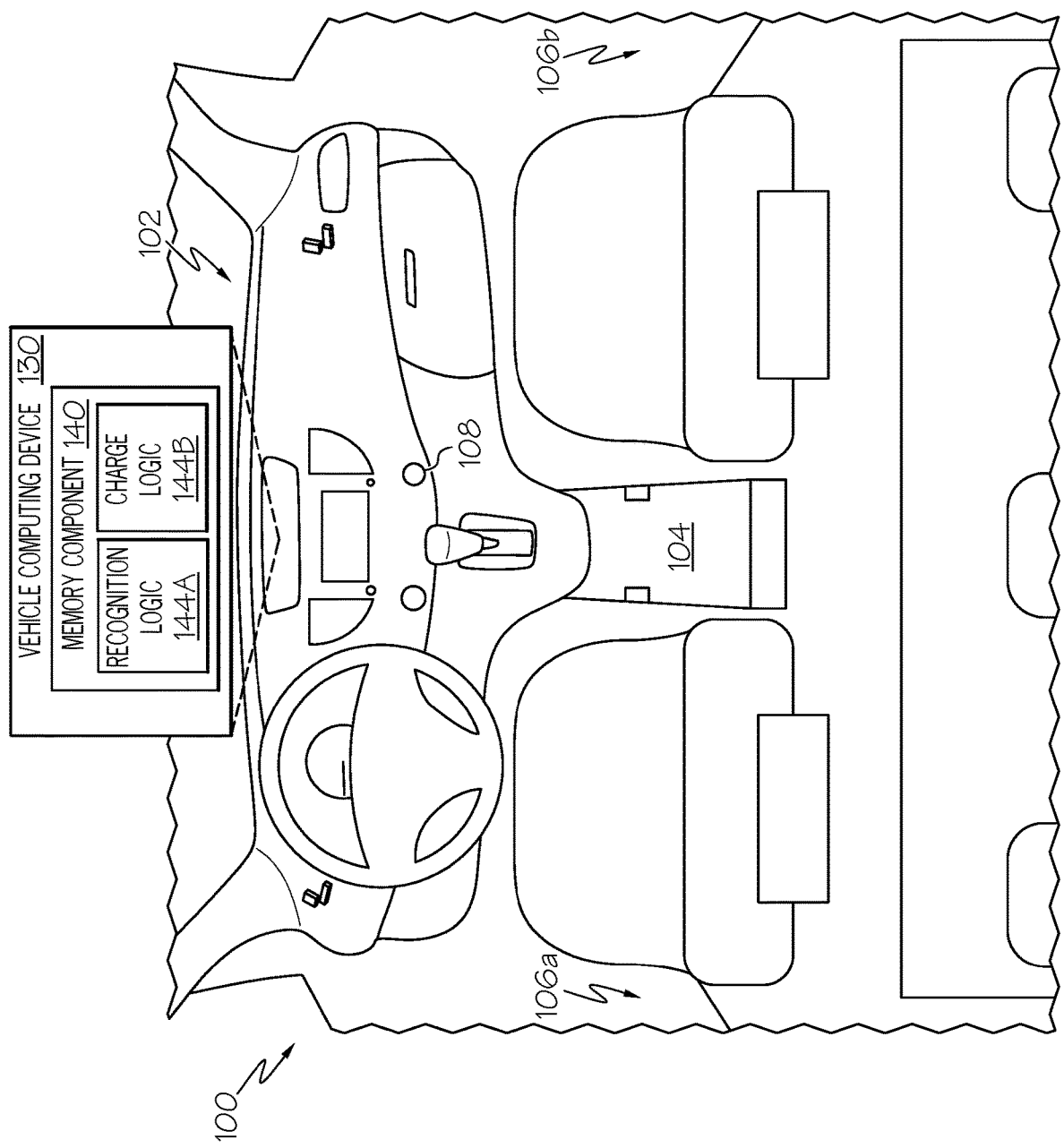
FIG. 1 depicts a vehicle interior for providing a movable charging coil, according to embodiments described herein.

Referring now to the drawings, FIG. 1 depicts a vehicle interior 100 for providing a movable charging coil, according to embodiments described herein. As illustrated, the vehicle interior 100 may include a dashboard console 102, a center console 104, and side consoles 106a, 106b (collectively referred to as "console 102" and "consoles 102"). Each of the consoles 102 may include one or more surfaces that are substantially horizontal (relative to ground). As such, one or more of the consoles 102 may include a device receptacle for receiving a mobile device, as described in more detail below.

Also provided in FIG. 1 are an image capture device 108 and a vehicle computing device 130. The image capture device 108 may be configured for capturing one or more images of a mobile device, such as a smart phone, tablet, earpiece, or other mobile electronic device that is capable of wireless charging. As described in more detail below, the vehicle computing device 130 may receive an image of the mobile device and identify the device type based on the received image. As such, while the image capture device 108 is depicted as being embedded in the dashboard console 102, this is merely one example.

It should be understood that while an image capture device 108 may be utilized for identifying the type of mobile device, this is also just one embodiment. In some embodiments, the vehicle computing device 130 may engage in a near field communication with the mobile device to determine a device type. In some embodiments, a user may manually identify the device type of the mobile device. In still some embodiments, the vehicle computing device 130 may infer a device type via a weight sensor, proximity sensor, and/or other sensor in or around the device receptacle.

Also provided in FIG. 1 is the vehicle computing device 130, which includes a memory component 140. The memory component 140 may store recognition logic 144a and charge logic 144b. The recognition logic 144a may cause the vehicle computing device 130 to capture image data, near-field communication data, and/or other sensor data and determine the type of mobile device that is received. The charge logic 144b may be configured for causing the vehicle computing device 130 to determine a voltage, amperage, and/or electrical charging requirement of the received mobile device. The charge logic 144b may also cause the vehicle computing device 130 to determine where the movable charging coil should be positioned, based on the type of mobile device received.

Figure 2:
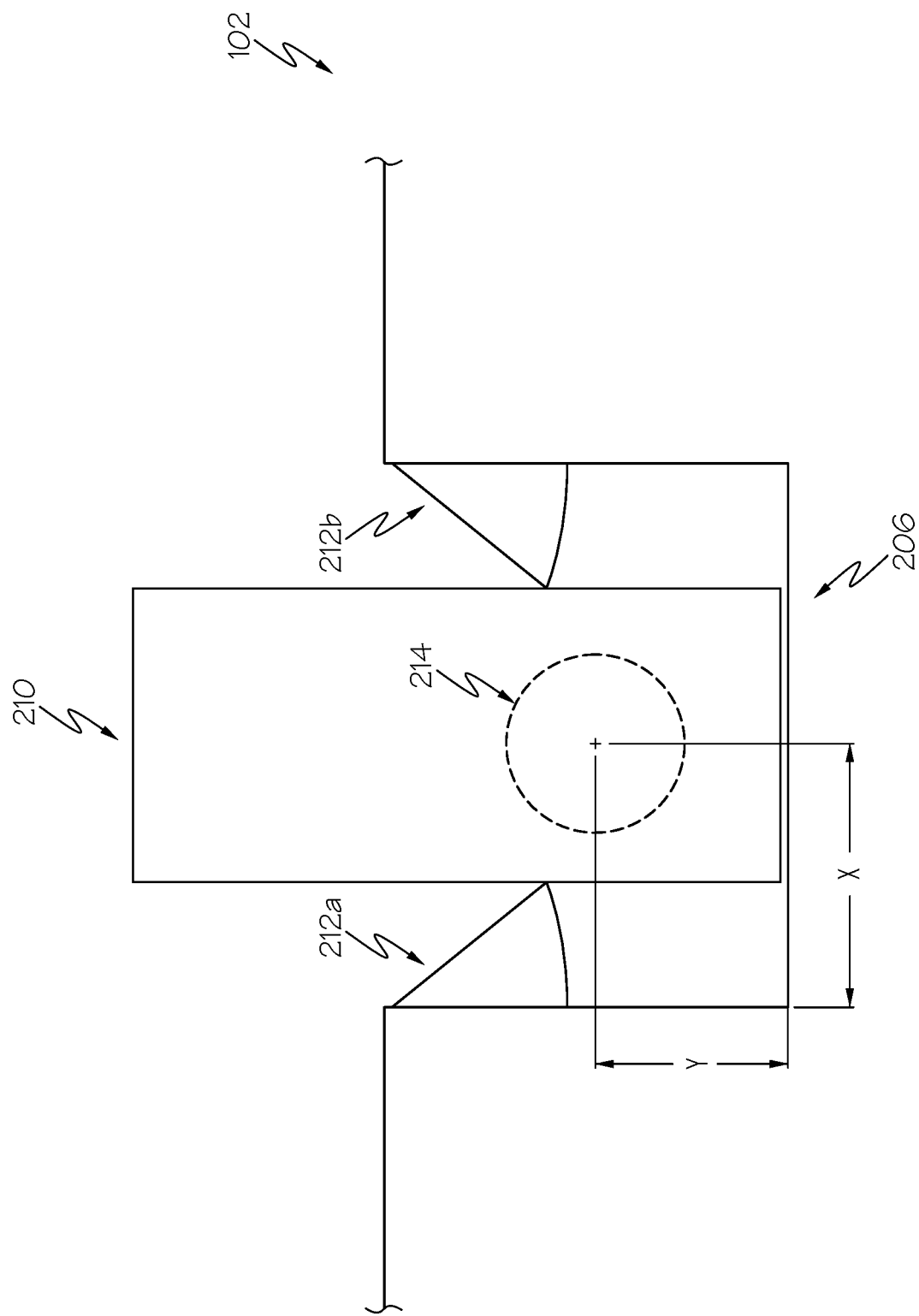
FIG. 2 depicts a front view of a device receptacle for providing a movable charging coil, according to embodiments described herein.

FIG. 2 depicts a front view of a device receptacle 206 for providing a movable charging coil, according to embodiments described herein. As illustrated, the device receptacle 206 may be disposed in a console 102 and may be substantially vertically disposed (relative to ground) for receiving a mobile device 210. As illustrated, a first biased retention finger 212a and a second biased retention finger 212b are disposed on opposing surfaces of the device receptacle 206. The first biased retention finger 212a and the second biased retention finger 212b may be biased via a spring, a hinge, and/or other force causing mechanism, such that a force is applied to the mobile device 210 to removably secure the position of the mobile device 210 in the device receptacle 206. The force should be great enough to secure the mobile device 210 under normal driving conditions, but allow the mobile device 210 to be removed by the user.

It will be understood that, in some embodiments, the first biased retention finger 212a and the second biased retention finger 212b may be configured be substantially coplanar when the mobile device 210 is not residing in the device receptacle 206. As such, the lengths of the first biased retention finger 212a and the second biased retention finger 212b may be such that when the mobile device 210 is not present, the device receptacle 206 is relatively hidden by the first biased retention finger 212a and the second biased retention finger 212b.

Also depicted in FIG. 2 is a charging area 214 for the mobile device 210. Specifically, the charging area 214 may identify an area that is proximate an internal induction coil of the mobile device 210. The induction coil may be utilized to receive inductive charging for a battery of the mobile device 210. As such, the charging area 214 may indicate a desired location of a charging coil for optimal charging of the mobile device 210.

Figure 3:
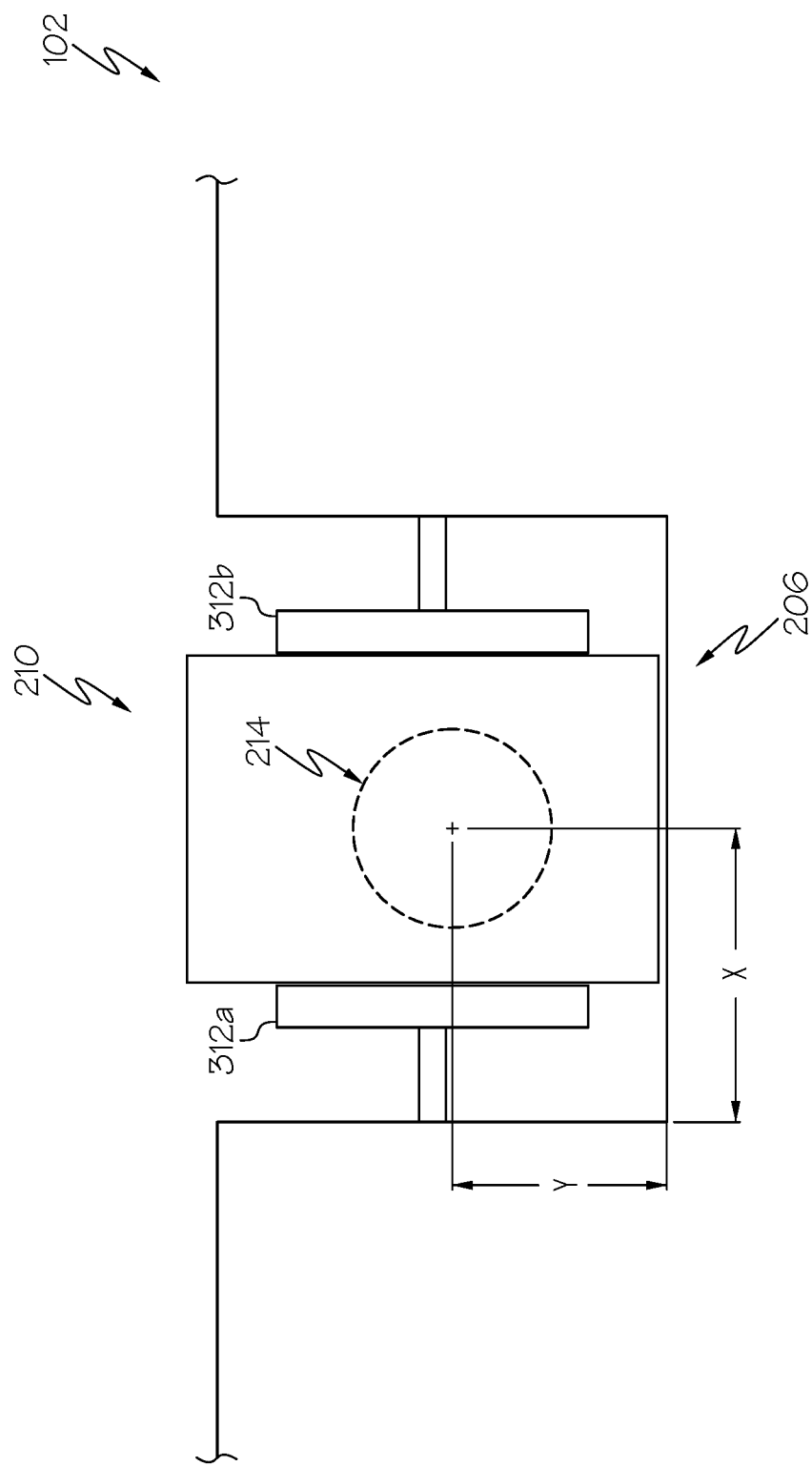
FIG. 3 depicts another front view of a device receptacle for providing a movable charging coil, according to embodiments described herein.

FIG. 3 depicts another front view of a device receptacle 206 for providing a movable charging coil, according to embodiments described herein. While FIG. 2 depicts the first biased retention finger 212a and the second biased retention finger 212b in a hinged configuration, this is merely one embodiment. FIG. 3 depicts a first biased retention finger 312a and a second biased retention finger 312b that are each configured as a movable surface of the device receptacle 206. Specifically, the first biased retention finger 312a and the second biased retention finger 312b in FIG. 3 are provided in a manner that is substantially vertically disposed and thus substantially coplanar (or parallel) with the respective surfaces of the device receptacle 206. While in some embodiments, the first biased retention finger 312a and the second biased retention finger 312b are spring-biased, this is one embodiment. Some embodiments may be coupled to one or more motors or actuators that will actuate to a predetermined location, based on the type of device being received.

It should be understood that in some embodiments the first biased retention finger 312a and the second biased retention finger 312b may actually be integrated into and/or part of the surface of the device receptacle 206. Accordingly, in some embodiments, the surfaces of the device receptacle 206 may move to accommodate different device types.

It should also be understood that while the first biased retention finger 212a (FIG. 2), the first biased retention finger 312a (FIG. 3), the second biased retention finger 212b (FIG. 2), and the second biased retention finger 312b (FIG. 3) may be configured to return to a resting position when the mobile device 210 is removed. However, some embodiments may be configured such that a release switch is provided on the console 102 for returning the biased retention fingers to resting position. The release switch may be embodied as a switch, manual button, virtual button, etc.

Figure 4:
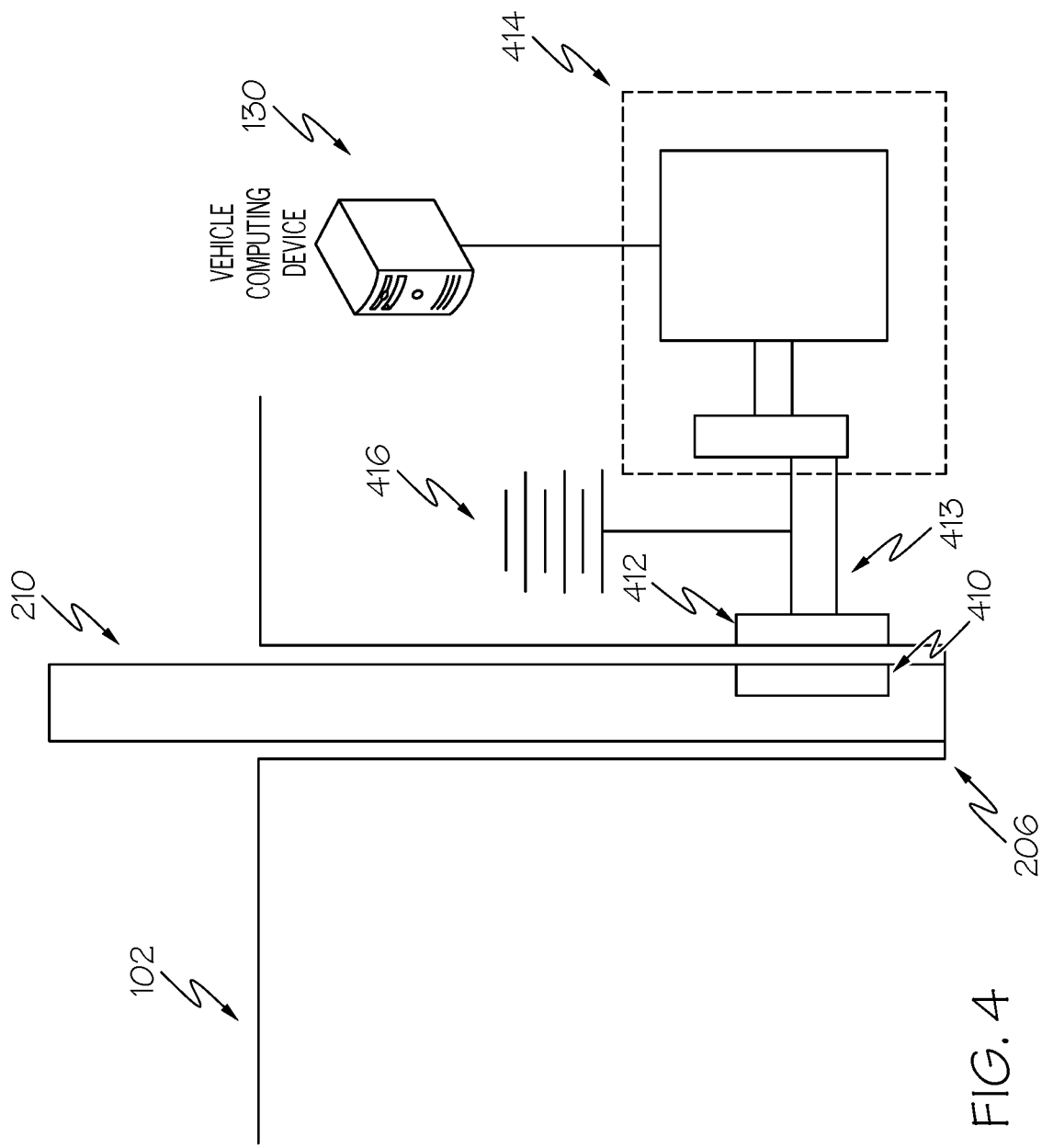
FIG. 4 depicts a side view of a device receptacle for providing a movable charging coil, according to embodiments described herein.

FIG. 4 depicts a side view of a device receptacle 206 for providing a movable charging coil 412, according to embodiments described herein. As illustrated, the console 102 may receive a mobile device 210 in the device receptacle 206. Once received, the vehicle computing device 130 may receive signals from the image capture device 108 (FIG. 1) and may determine a type of mobile device that has been received. In some embodiments, the device receptacle 206 may include a weight sensor and/or proximity sensor for detecting the weight and/or dimensions of the received mobile device 210. Based on this data, the vehicle computing device 130 may determine the type of mobile device that has been received.

Depending on the type of mobile device that has been received, the vehicle computing device 130 may determine a location of an induction coil 410 of the mobile device 210. Knowing the position of the mobile device 210 and the induction coil 410, the vehicle computing device 130 may actuate a motor 414 that is coupled to a movable charging coil arm 413 to substantially align a movable charging coil 412 with the induction coil 410. Once aligned, a power supply 316 may provide charging energy to the induction coil 410. This adjustment may include an adjustment to the vertical position of the movable charging coil 412 and/or an adjustment to the horizontal position of the movable charging coil 412. Additional adjustments may be made to the distance between the movable charging coil 412 and the induction coil 410 to further improve the charging connection.

Some embodiments may be configured such that the vehicle computing device 130 receives a signal related to a strength of charging connection between the movable charging coil 412 and the induction coil 410. Based on the strength of charging connection, a movement of the movable charging coil 412 may be determined to improve the strength of charging connection. Additionally, the movable charging coil 412 and/or the movable charging coil arm 413 may be repositioned in one to three dimensions to improve the charging connection.

Figure 5:
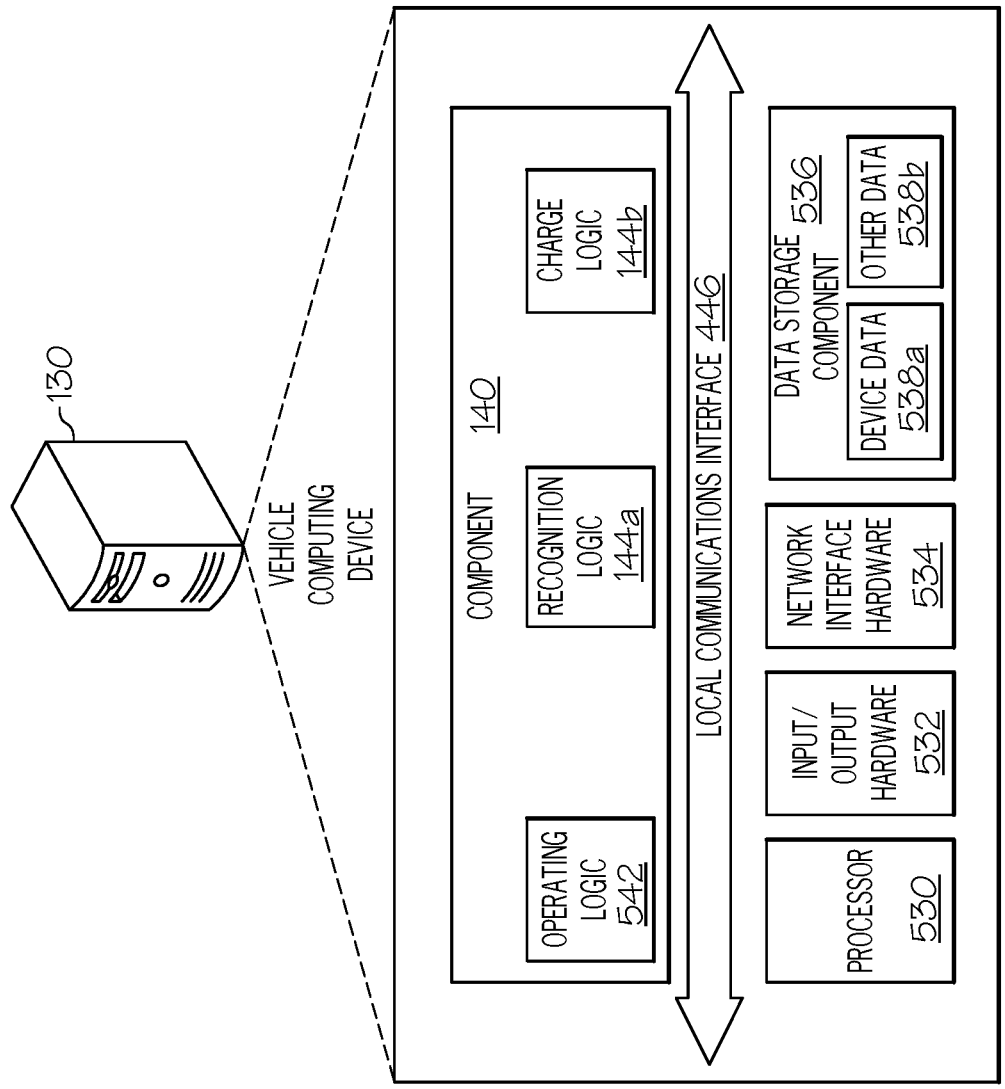
FIG. 5 depicts a vehicle computing device for providing a movable charging coil, according to embodiments described herein.

FIG. 5 depicts a vehicle computing device 130 for providing a movable charging coil 412, according to embodiments described herein. The vehicle computing device 130 includes a processor 530, input/output hardware 532, a network interface hardware 534, a data storage component 536 (which stores device data 538a and/or other data 538b), and the memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the vehicle computing device 130 and/or external to the vehicle computing device 130.

The memory component 140 may store operating logic 542, the recognition logic 144a and the charge logic 144b. The recognition logic 144a and the charge logic 144b may each include a plurality of different pieces of logic, each of which may be embodied as a computer program, firmware, and/or hardware, as an example. A local communications interface 546 is also included in FIG. 5 and may be implemented as a bus or other communication interface to facilitate communication among the components of the vehicle computing device 130. The processor 132 may include any processing component operable to receive and execute instructions (such as from a data storage component 536 and/or the memory component 140).

The network interface hardware 534 may include and/or be configured for communicating with any wired or wireless networking hardware, including an antenna, a modem, LAN port, wireless fidelity (Wi-Fi) card, WiMax card, Bluetooth chip, USB card, mobile communications hardware, and/or other hardware for communicating with other networks and/or devices. From this connection, communication may be facilitated between the vehicle computing device 130 and other computing devices (such as the mobile device 210).

The operating logic 542 may include an operating system and/or other software for managing components of the vehicle computing device 130. As also discussed above, the recognition logic 144a may reside in the memory component 140 and may be configured to cause the processor 530 to recognize a type of mobile device received at a device receptacle 206. Similarly, the charge logic 144b may be utilized to provide a desired position for a charging coil and a proper charging energy.

It should be understood that while the components in FIG. 5 are illustrated as residing within the vehicle computing device 130, this is merely an example. In some embodiments, one or more of the components may reside external to the vehicle computing device 130. It should also be understood that, while the vehicle computing device 130 is illustrated as a single device, this is also merely an example. In some embodiments, the recognition logic 144a and the charge logic 144b may reside on different computing devices. As an example, one or more of the functionalities and/or components described herein may be provided by a remote computing device, which may be coupled to the vehicle computing device 130 via a network, such as a local network and/or a wide area network.

Additionally, while the vehicle computing device 130 is illustrated with the recognition logic 144a and the charge logic 144b as separate logical components, this is also an example. In some embodiments, a single piece of logic may cause the vehicle computing device 130 to provide the described functionality.

As illustrated above, various embodiments for providing a movable charging coil are disclosed. These embodiments allow for the changing of device size as a user upgrades devices, changes devices, etc., while still being able to charge the inserted device.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein include systems, methods, and non-transitory computer-readable mediums for providing a movable charging coil. It should also be understood that these embodiments are merely exemplary and are not intended to limit the scope of this disclosure.

What is claimed is:

1. A vehicle for providing a movable charging coil comprising:
    a console that includes a device receptacle for receiving any of a plurality of differently sized mobile devices;
    a first biased retention finger and a second biased retention finger disposed on the device receptacle, wherein the first biased retention finger and the second biased retention finger are configured as movable surfaces and removably secure a mobile device that is received by the device receptacle, wherein the mobile device that is received by the device receptacle includes a battery and an induction coil for receiving wireless charging for the battery;
    a movable charging coil that is disposed within the console; and
    a computing device that includes logic that, when executed by a processor causes the computing device to perform at least the following:
        determine a type of mobile device received by the device receptacle;
        adjust, via an actuator, a position of at least one of the first biased retention finger and the second biased retention finger to a predetermined location, based on the type of mobile device received by the device receptacle; and adjust a position of the movable charging coil, based on the type of mobile device received.

2. The vehicle of claim 1, wherein the first biased retention finger and the second biased retention finger substantially cover the device receptacle when the mobile device is not present in the device receptacle.

3. The vehicle of claim 1, further comprising an image capture device, wherein the logic causes the computing device to perform at least the following:
   receive an image of the mobile device from the image capture device;
   determine the type of mobile device from the image, and determine an adjustment to at least one of the following:
      a vertical position or a horizontal position of the movable charging coil based on the type of mobile device.

4. The vehicle of claim 1, wherein the logic further causes the computing device to perform at least the following:
   receive a signal related to a strength of charging connection between the movable charging coil and the induction coil; and
   determine a movement of the movable charging coil to improve the strength of charging connection.

5. The vehicle of claim 1, further comprising a motor to move the movable charging coil.

6. The vehicle of claim 1, further comprising a release switch that is coupled to the first biased retention finger and the second biased retention finger for moving the first biased retention finger and the second biased retention finger.

7. A system for providing a movable charging coil comprising:
   a console with a device receptacle;
   a first biased retention finger and a second biased retention finger to removably secure any of a plurality of differently sized mobile devices, wherein the first biased retention finger and the second biased retention finger are configured as movable surfaces and are disposed proximate the device receptacle, wherein a mobile device that is received by the device receptacle includes a battery and an induction coil for receiving wireless charging for the battery;
   a movable charging coil that is disposed within the console;
   a movable charging coil arm that is coupled to the movable charging coil; and
   a computing device that includes logic that, when executed by a processor, causes the computing device to perform at least the following:
      determine a type of mobile device received in the device receptacle;
      adjust, via an actuator, a position of at least one of the first biased retention finger and the second biased retention finger to a predetermined location, based on the type of mobile device received by the device receptacle;
      adjust a position of the movable charging coil, based on the type of mobile device received.

8. The system of claim 7, wherein the first biased retention finger and the second biased retention finger substantially cover the device receptacle when the mobile device is not present in the device receptacle.

9. The system of claim 7, further comprising an image capture device, wherein the logic causes the computing device to perform at least the following:
   receive an image of the mobile device from the image capture device;
   determine the type of mobile device from the image; and
   determine an adjustment to the position of the movable charging coil based on the type of mobile device.

10. The system of claim 7, wherein the logic further causes the computing device to perform at least the following:
    receive a signal related to a strength of charging connection between the movable charging coil and the induction coil; and
    determine a movement of the movable charging coil to improve the strength of charging connection.

11. The system of claim 7, further comprising a motor to move the movable charging coil and the movable charging coil arm.

12. The system of claim 7, further comprising a release switch that is coupled to the first biased retention finger and the second biased retention finger for releasing the first biased retention finger and the second biased retention finger.

13. A console for providing a movable charging coil comprising:
    a device receptacle;
    a first biased retention finger and a second biased retention finger disposed on the device receptacle, wherein the first biased retention finger and the second biased retention finger are configured as movable surfaces and removably secure any of a plurality of differently sized mobile devices received by the device receptacle, wherein a mobile device that is received by the device receptacle includes a battery and an induction coil for receiving wireless charging for the battery;
    a movable charging coil that is disposed within the console; and
    a computing device that includes logic that, when executed by a processor causes the computing device to perform at least the following:
       determine a type of mobile device received by the device receptacle;
       adjust, via an actuator, a position of at least one of the first biased retention finger and the second biased retention finger to a predetermined location, based on the type of mobile device received by the device receptacle; and
       adjust a vertical position and a horizontal position of the movable charging coil, based on the type of mobile device received.

14. The console of claim 13, wherein an image capture device captures an image of the mobile device and wherein the logic causes the computing device to perform at least the following:
    receive the image;
    determine the type of mobile device from the image; and
    determine an adjustment to at least one of the following:
       the vertical position or the horizontal position of the movable charging coil based on the type of mobile device.

15. The console of claim 13, wherein the logic further causes the computing device to perform at least the following:
    receive a signal related to a strength of charging connection between the movable charging coil and the induction coil; and
    determine a movement of the movable charging coil to improve the strength of charging connection.

16. The console of claim 13, further comprising a motor to move the movable charging coil.

17. The console of claim 13, further comprising a release switch that is coupled to the first biased retention finger and the second biased retention finger for releasing the first biased retention finger and the second biased retention finger.

* * * * *